Patented Sept. 22, 1931

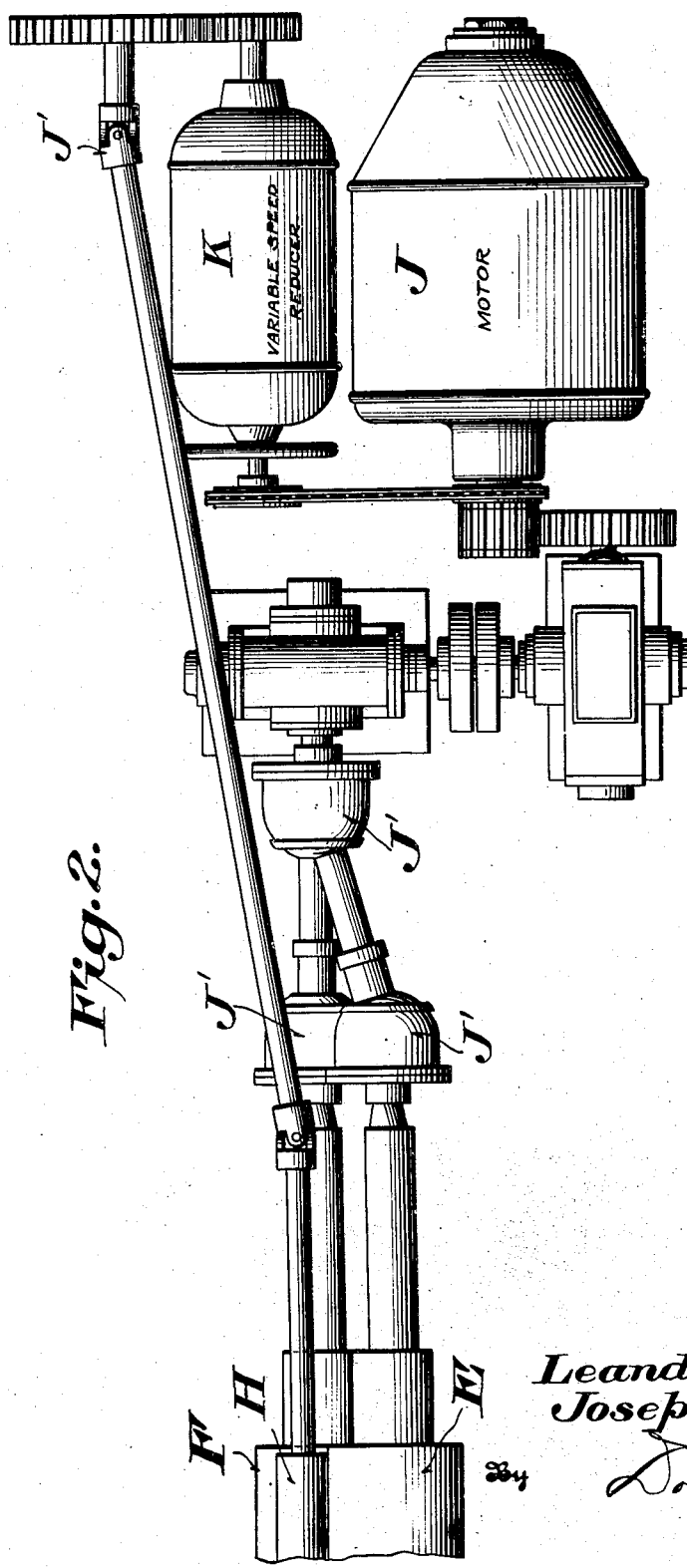

1,824,365

UNITED STATES PATENT OFFICE

LEANDER N. POND AND JOSEPH H. LEWIS, OF KINGSPORT, TENNESSEE, ASSIGNORS TO BLUE RIDGE GLASS CORPORATION, OF KINGSPORT, TENNESSEE, A CORPORATION OF NEW YORK

PROCESS OF AND APPARATUS FOR THE MANUFACTURE OF WIRE GLASS

Application filed July 31, 1929. Serial No. 382,391.

This invention relates to a method of and means for producing wire glass in which the trellis of wire is fed to the molten glass before the latter passes through the forming pass.

Generally speaking, this invention is shown applied to a forming machine in which molten glass issues from a furnace and flows to a forming pass located but slightly below the level of the glass fed to the pass, and in which a wire trellis is fed downwardly into the bath in advance of the forming pass to be fed with the glass through the pass and to be thus incorporated into the sheet as formed.

Among the objects had in view is the reduction as far as possible of the period during which the wire is exposed to heat from the molten glass or from the furnace and the amount of heat to which it is so exposed, prior to its immersion in the glass; a reduction of the time in which the wire is in contact with the glass prior to the formation of the sheet at the pass, and means for centering the wire in the sheet as formed; and in the construction, arrangement and combination of the several parts as will be hereinafter described and claimed.

Referring now to the accompanying drawings in which corresponding parts are designated by similar marks of reference,—

Figure 2 is a fragmental side elevation of certain of the parts of our improved machine.

Figure 1:
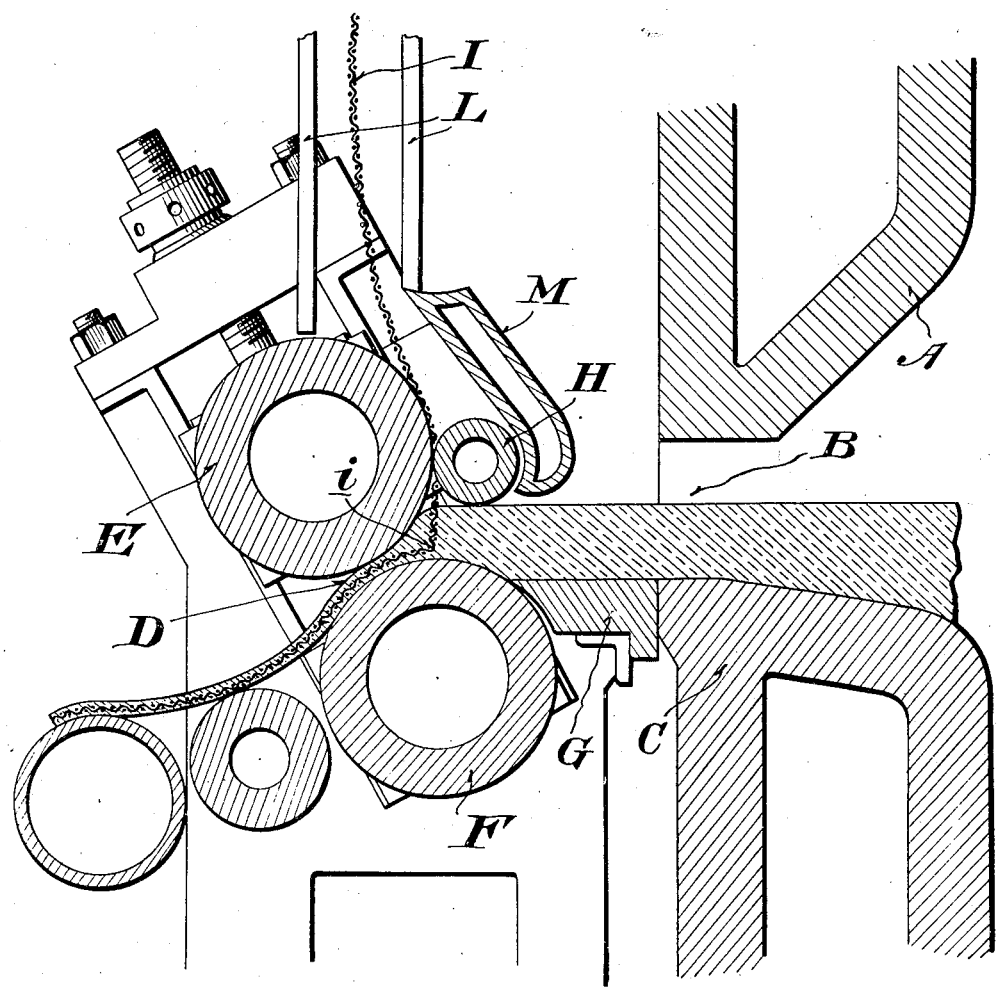
Figure 1 is a vertical section through a wire glass forming machine embodying our invention and adapted to carry out the process herein claimed.

A represents a portion of a suitable glass furnace having a glass issue port B over the sill C. Opposite to, but removed from the issue port is located the glass forming pass D formed by the upper and lower rolls E and F. The space between the sill C and the lower roll F being bridged by the slab G. The forming pass D is as shown above the level of the sill C and below the glass level in the furnace. The above parts constitute a sheet forming machine. Located between the upper roll E and the furnace is the wire trellis feeding roll H, having resilient pressure against the side of the upper forming roll E. It will be understood that all of the above rolls are properly controlled in temperature, as by water cooling. The wire trellis I to be incorporated in the sheet is fed into the molten glass by being led between the roll E and the roll H, and after being fed into the glass feeds through the pass D. The roll H is driven at a suitable speed in respect to the roll E. As shown, by preference the two sheet-forming rolls and the roll H are driven by a variable speed motor J by which the speed of all the rolls may be simultaneously and equally varied. In the drive to the wire feed roll H is a variable speed coupling K, so that the speed of the roll H may be varied in respect to the roll E. The drive for the several rolls is through universal couplings J'.

It is important that the wire I be prevented from getting too hot before immersing in the glass, as such heating would cause oxidization with the resultant formation of bubbles in the glass after the wire is immersed therein. Accordingly, the wire I is led down between suitable shields L and under the protection of a water cooled plate M, the lower end of which is adjacent to the roll H, and the roll H is adjustable vertically so that its lower edge may be kept in close proximity to the glass feeding to the forming pass, thereby preventing heated air and products of combustion sweeping past the lower surface of the roll H to heat the wire between the line of centers of the rolls E and H and the point where the wire is immersed in the glass, and to reduce the period of heating the roll H is preferably of relatively small diameter.

The period of immersion of the trellis in the glass is reduced by tilting the line of center of the rolls E and F as shown in Figure 1. The inclination shown has been found a desirable angle for this purpose. The tilting of the line of centers also tends to reduce the space between the line of centers of the rolls E and H and the glass level and thus the preheating of the wire prior to its introduction into the glass.

The position of the wire trellis in the sheet is controlled by the peripheral speed of the wire feed roll H in respect to the peripheral speed of the rolls E and F, and thus to the speed of sheet formation. The speed of the roll H is so selected that it tends to drive the wire at a slightly greater speed than the speed of sheet formation with the result that the wire instead of following and hugging the roll E, is separated therefrom by the production of a bend as is represented at $i$. This bend tends to fix the level from which the wire is delivered to the forming pass and hence the height of the wire in the pass and its position in the sheet.

As pointed out the delivery of the wire to the glass is at an angle to the line of movement of the glass through the pass. It has also been pointed out that by inclining the line of centers of the rolls advantageous results as to the temperature of the wire are obtained. Generally speaking, we have ascertained that this invention may be carried out either with rolls in which the line of centers makes an angle of 0° to 80° with the vertical. At 0° the effective control on the position of the wire by the roll H is at the maximum; but difficulty is experienced from the heating of the wire and discoloration of the glass. These last two are reduced to a minimum at 30°, but the control of position by means of the speed of the roll H is lessened, but is still usefully effective.

Having thus described our invention what we claim and desire to secure by Letters Patent is:—

1. The hereinbefore described process of manufacturing wire glass which comprises feeding molten glass to and through a forming pass between rolls, feeding wire to the molten glass in a direction at a substantial angle to the direction of movement of the wire through the pass, and determining the position of the wire in the glass sheet by varying the speed of drive on the wire in relation to the speed of the forming rolls.

2. The hereinbefore described process of manufacturing wire glass which comprises feeding molten glass to and through a forming pass between rolls, feeding wire to the molten glass in a direction at a substantial angle to the direction of movement of the wire through the pass, and determining the position of the wire in the glass sheet by varying the speed of drive on the wire in relation to the speed of the forming roll, and the temperature of the forming rolls.

3. The combination with a reservoir of molten glass, of a pair of rolls having a sheet forming pass between them, the line of centers of the rolls being inclined to the vertical, and a wire feed roll adjacent to the upper roll of the pass, with means for driving the feed roll at a speed greater than the the speed of the sheet forming roll.

4. In a wire glass machine the combination with a glass reservoir, of a pair of sheet forming rolls, means for feeding wire to the reservoir and to the pass, and means for varying the speed at which the wire feeding means tends to so deliver the wire in respect to the speed of the glass forming rolls.

5. In a wire glass machine the combination with a glass reservoir, of a pair of sheet forming rolls, a wire feed roll delivering wire to the reservoir and to the pass, and means for varying the speed of the wire feed roll in respect to the speed of the glass forming rolls.

6. In a wire glass machine, the combination with a glass reservoir, of a pair of sheet forming rolls, a wire feed roll adjacent to the upper glass forming roll, and forming therewith a wire delivering pass, and means for varying the speed of the wire feeding roll in respect to the speed of the adjacent glass forming roll.

7. The combination with a reservoir of molten glass, of a pair of rolls, the one above the other, having a sheet forming pass between them, means for feeding wire into the glass in the reservoir and to the pass out of contact with either roll, said means comprising means tending to feed the wire at a greater speed than the speed of sheet formation.

8. The combination in a wire glass machine, of a pair of sheet forming rolls having a forming pass between them, a roller having a wire forming pass between it and the upper of the sheet forming rolls, the lower edge of the roller being adjacent to the level of the glass in the reservoir, and shields above the wire forming pass.

9. In a glass forming machine, the combination with a reservoir for molten glass, of a pair of forming rolls having a forming pass between them, a heat-shielded conduit for the wire prior to its introduction into the reservoir, the shielded conduit terminating in a wire feeding roll having a wire feed pass adjacent thereto.

In testimony whereof we hereunto affix our signatures.

LEANDER N. POND.
JOSEPH H. LEWIS.